March 17, 1970  F. HOM  3,500,645
THRUST REVERSER
Filed April 10, 1968  3 Sheets-Sheet 1
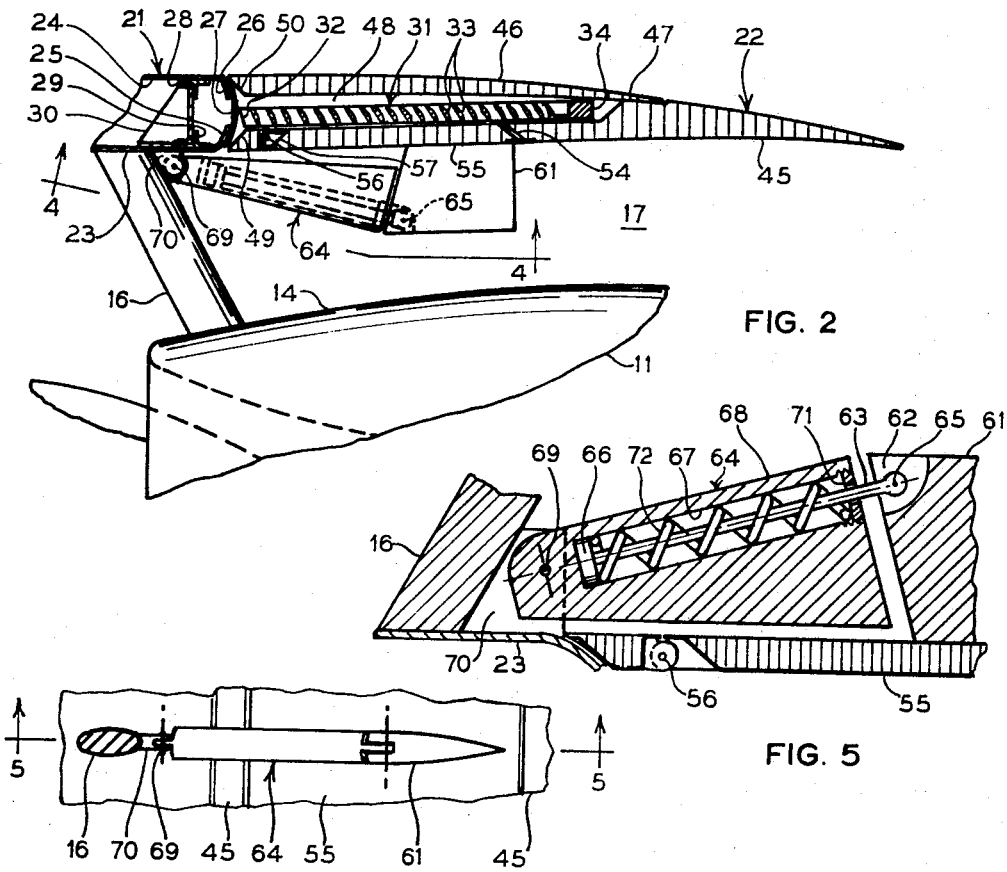
FIG. 2
FIG. 5
FIG. 4
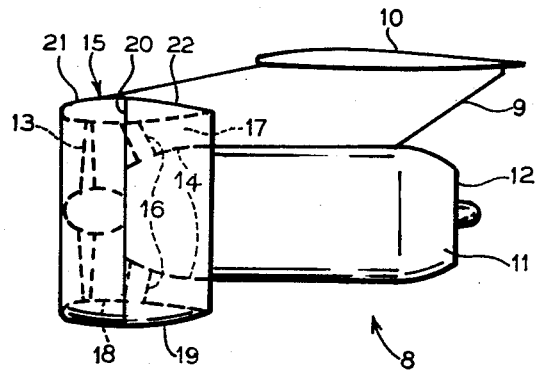
FIG. 1
INVENTOR.
F. HOM
BY
George E. Pearson
ATTORNEY

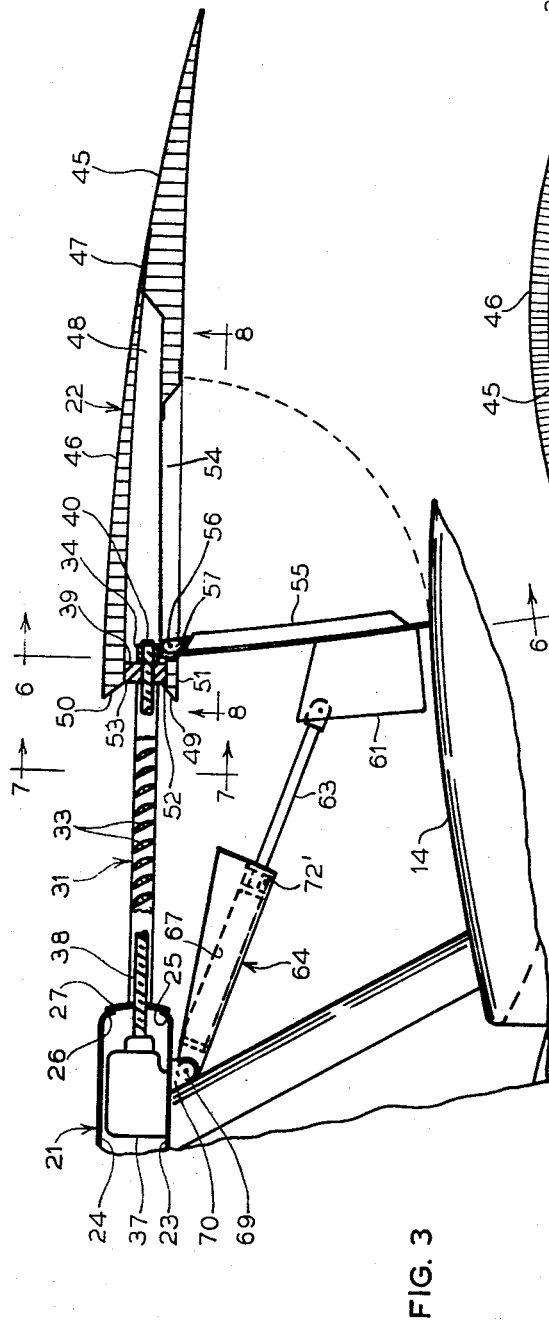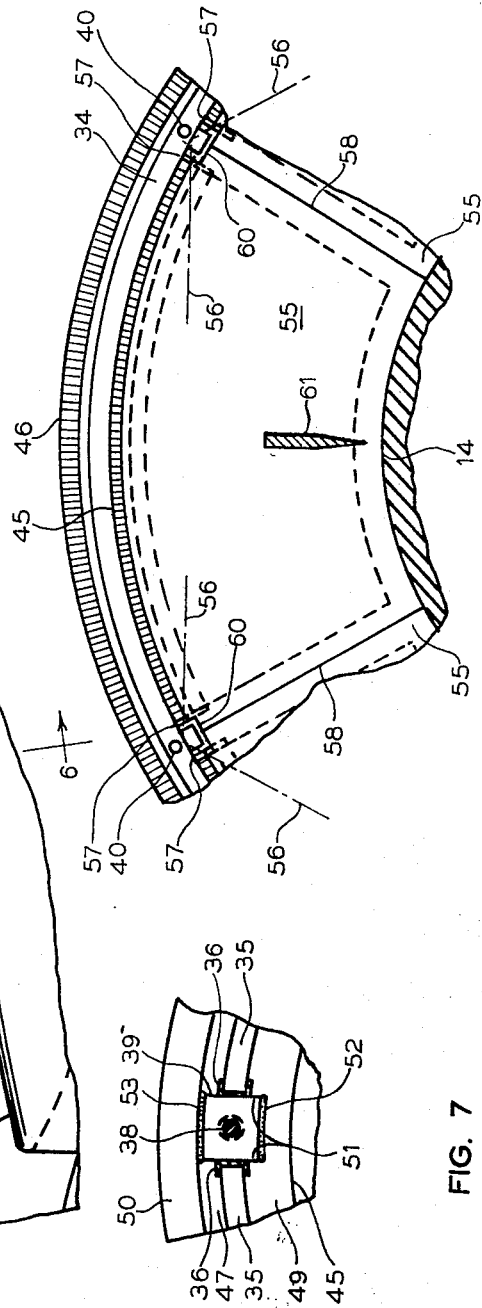

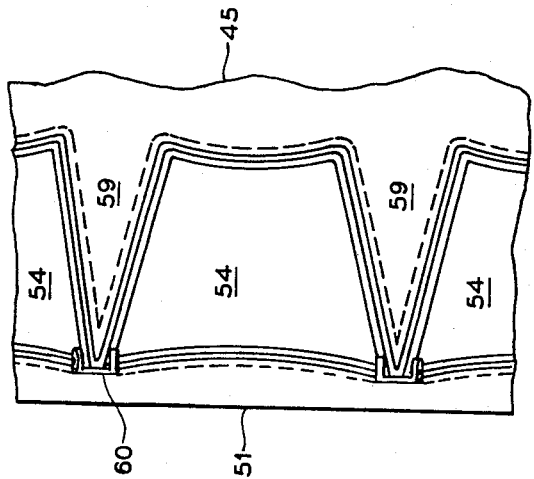
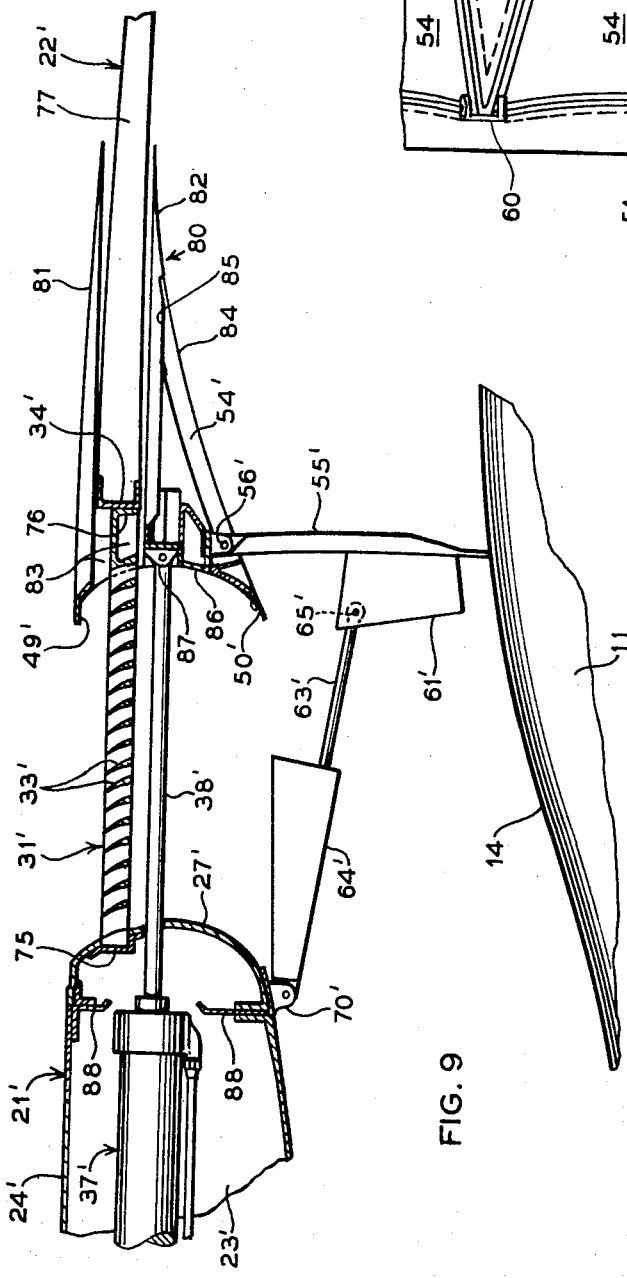
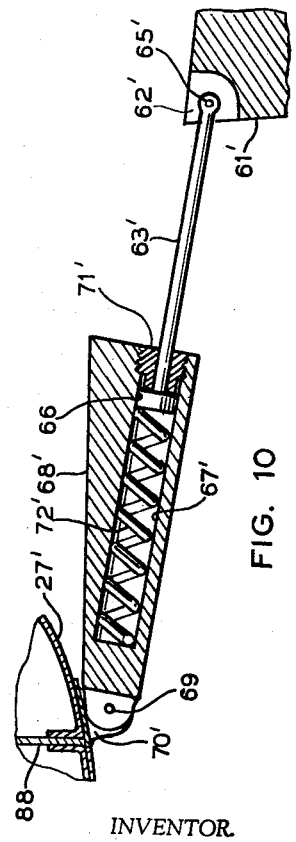

United States Patent Office 3,500,645
Patented Mar. 17, 1970

3,500,645
THRUST REVERSER
Felix Hom, La Mesa, Calif., assignor to Rohr Corporation, Chula Vista, Calif., a corporation of California
Filed Apr. 10, 1968, Ser. No. 720,318
Int. Cl. F02k 1/00, 3/02; B64c 15/04
U.S. Cl. 60—229                    8 Claims

ABSTRACT OF THE DISCLOSURE

A thrust reverser arrangement for a fan type jet propulsion engine includes a fixed ring of flow reversing cascades which are uncovered when the aft portion of a split cowl for the engine fan is translated rearwardly in telescoping relation with respect to the cascade structure. During the terminal translational movement of the aft cowl portion into its fully deployed position peripherally disposed blocker doors which are pivotally secured to the aft cowl portion and have telescoping link connections with the forward cowl portion are rotated into position to block the fan air and force the same through the cascades, the arrangement thus being such that the flow area of the cascades is substantially fully opened before the telescoping links become effective to rotate the doors to blocking position. The aft cowl portion including the blocker doors are formed of honeycomb panel structure, and the aft portion has an annular recess for receiving the cascade structure in stowed position. Ball screw actuators disposed within longitudinal channels in the cascade structure produce the translational movements of the cowl aft portion to deployed position and support the same for such movements.

In an alternative split cowling arrangement, the aft cowl portion is fixed, and a translatable sleeve moves to expose the cascades and rotate the doors.

BACKGROUND OF THE INVENTION

This invention relates generally to thrust reversers for bypass fan type jet propulsion engines and more particularly to improvements therein.

Various thrust reversers of this type have heretofore been provided in which a translatable fan cowl portion is moved to expose a ring of flow reversing cascades to which the normal fluid flow through the bypass duct is diverted by a plurality of blocker doors or flaps which have been rotated into position to block the bypass duct. While such prior art reversers have been generally suitable for the purposes intended, they have had several structural and functional limitations imposed by the specific structure and combination of parts employed to accomplish the reverser function without compromising any of the aerodynamic characteristics, performance, and functions desired of the engine. For example, it has been considered desirable to provide a reverser capable of interfitting with the aircraft structure as it exists to effect other aerodynamic functions while also being capable of supplying thrust modulation characteristics to provide for immediate and full thrust during a landing operation while also maintaining the engine at its full rotating speed and without changing loading on the fan or gas generator. It further has been considered important that the reverser have a fail-safe characteristic enabling it to retain a specific position, that is, in the event of structural failure, that it will stay in a reverse thrust position while being used as a landing roll reverser, or to return to a fully stowed position while being used for thrust modulation in a cruise condition.

SUMMARY OF THE INVENTION

In accordance with the present invention, the thrust reverser hereinafter disclosed and claimed is adapted particularly for use with a jet propulsion powerplant of the front fan bypass type having an engine and a fan concentric therewith and extended radially beyond the wall of the engine. A cowl surrounds the fan and is spaced from the engine wall to provide a bypass duct therewith. The cowl is split into fore and aft cylindrical portions which form inner and outer flow surfaces when closed in cruise position.

A plurality of peripherally disposed ball screw actuators are secured to the forward cowl portion and have drive shaft members which extend longitudinally into the aft cowl portion for translational support of the same to an extended position rearwardly of the forward cowl portion to thus develop an annular opening therebetween. A ring of flow reversing cascades secured to the forward cowl portion is disposed within the region of this opening, and the cascades become fully exposed when the aft cowl portion is telescopically moved thereover into its extended position. The ring of cascades have longitudinal channels through which the ball screw drive shafts extend to the end ring of the cascade structure where the shafts conveniently are journalled. The aft cowl portion is constructed of honeycomb panel structure which is recessed to receive the cascade ring structure and the driven members of the ball screw actuators which respectively move along their drive shafts and through the associated cascade channels as the aft cowl portion is moved translationally.

A plurality of peripherally disposed blocker flaps or doors, also formed of honeycomb panel structure, are pivotally secured to the aft cowl portion and form a part of its inner flow surface when in its cruise position. Spring biased telescoping links respectively connect the doors with the forward cowl portion and cause the doors to be rotated into position to block the bypass duct when the lost motion in the links is taken up as the aft cowl portion moves into the terminal phase of its translational movement rearwardly to extended position. The doors in their extended rotated position engage the engine wall to block the bypass duct and force the normal flow of bypass air to pass through the flow reversing cascades to thus produce the desired reverse thrust. This does not occur until the cascades are substantially opened thereby to avoid overloading of the engine. The ball screw drives will retain the parts in their moved positions, and in the event of structural failure, a fail-safe operating condition is provided in that the fan air forces on the blocker doors will retain or move the same into blocking position.

In an alternative arrangement, a fixed panel type aft cowl portion is secured to the end ring of the cascades, and a translatable panel type sleeve cowl section to which the blocker doors are pivotally secured is constructed and arranged to move telescopically over the cascades and the fixed cowl aft portion.

OBJECTS

An object of the present invention is to provide a new and improved thrust reverser arrangement for bypass type turbojet engines.

Another object is to provide a reverser arrangement of this type which may be employed effectively with existing fan engine structures without comprising any of the aerodynamic characteristics desired for other functions of the engine.

Another object is to provide such a reverser arrangement in which the flow reversing cascades are substantially opened before the closing movement of the blocker doors is started thereby to cause only a minimum of interference with the normal operation of the engine during thrust modulation of the reverser.

Another object is to provide such a reverser arrangement in which the translational and rotational movements of the aft cowl portion and blocker doors is effected by simple actuating means which also serve to support these members for their respective movements thereby minimizing the number of elements required for the purpose.

Yet another object is to provide such a reverser arrangement in which the cascades may be covered, or alternatively exposed, by a translatable member which may be the aft cowl portion itself or a sleeve structure to which the blocker doors are secured and which moves telescopically with respect to the cascades and the aft cowl portion.

Still another object is to provide a thrust reverser arrangement of the aforedescribed type which is effective in the event of a structural failure to assume a fail-safe position in which the reverser retains its deployed or thrust reversing position.

Still other features, advantages and objects of the present invention are inherent in or to be implied from the novel construction, combination and arrangement of the parts constituting a preferred embodiment of the invention as will become more fully apparent as the description proceeds.

BRIEF DESCRIPTION OF THE DRAWINGS

In the accompanying drawings:

FIG. 1 is a view in elevation of a fan type jet propulsion powerplant supported from an aircraft wing and employing the thrust reverser of the present invention;

FIG. 2 is an enlarged cross-sectional view of the thrust reverser constructed in accordance with a preferred embodiment thereof and shown in its cruise position;

FIG. 3 is a view similar to FIG. 2 and showing the reverser in its reverse thrust position;

FIG. 4 is a view of the telescoping link and door taken along the line 4—4 of FIG. 2;

FIG. 5 is a fragmentary sectional view, somewhat enlarged, taken along the line 5—5 of FIG. 4;

FIG. 6 is a fragmentary view as seen along the line 6—6 of FIG. 3;

FIG. 7 is a fragmentary view, somewhat enlarged, as seen along the line 7—7 of FIG. 3;

FIG. 8 is a fragmentary view of the door seat arrangement, the doors being removed;

FIG. 9 is a view similar to FIG. 2 and showing the thrust reverser constructed in accordance with an alternative embodiment of the invention; and FIG. 10 is a view similar to FIG. 5 and showing the telescoping link arrangement of FIG. 9.

THE SPECIFICATION

Referring now to the drawings for a more complete understanding of the invention, and first more particularly to FIG. 1, a fan type engine generally designated 8 is shown supported by a pylon 9 from an aircraft wing 10. Fan type engine 8 comprises a jet engine 11 which discharges a gaseous effluent through nozzle 12 to provide thrust. In this case, the gas jet thrust is augmented by air flow produced by a fan 13 driven by the engine and disposed concentric with the engine 11 and extended radially beyond the wall 14 thereof. A cowling generally designated 15 is spaced from and supported by suitable struts 16 extended from the engine wall 14 to form a bypass duct 17 for flow of the fan air therebetween.

For purpose of the present invention, and in order to provide a simple, light weight structure for reversing the fan air flow through the bypass 17 without compromising the physical characteristics of the engine geometry while also providing a minimum cowling thickness between its inner and outer flow surfaces 18 and 19, respectively, the cowling 15 is used as part of the reverser structure and, to this end, is split along the peripheral line 20 to form a forward cowl portion 21 and an aft cowl portion 22, both portions of which form inner and outer flow surfaces 18 and 19 in the cruise position of the thrust reverser as shown in FIG. 2.

Referring now to FIGS. 2 to 8, forward cowl portion 21 comprises inner and annular cowl plates 23 and 24 which are suitably joined at their respective outwardly and inwardly directed flanges 25 and 26 by a ring member 27 which is arcuate in cross section and serves as a sealing ring between the forward and aft cowl portions 21 and 22. Forward cowl portion 21 also comprises inner and outer peripherally spaced T-sections 28 and 29 which are joined by suitable gusset members 30.

Ring member 27 also serves to support the ring of flow reversing cascades generally designated 31 and comprising the upstream ring member 32 which is fastened to sealing ring 27 usual flow reversing cascades 33 and end support ring member 34. As best seen in FIGS. 3 and 7, the cascade ring structure 31 also comprises a plurality of peripherally disposed cascade sections 35 which are made up of the cascades 33 and which extend and are secured to longitudinally extending channel members 36 between which the cascades extend peripherally. Adjacently disposed pairs of the cascade sections 35 and their channel members 36 define cascade channels therebetween which are used for a purpose presently to appear.

A plurality of ball screw actuators generally designated 37, FIG. 3, are disposed peripherally between cowl plates 23 and 24 of the forward cowl portion 21 and conveniently are mounted on inner cowl plate 23. Actuators 37 may be of any suitable commercially available type such, for example, as the actuators manufactured by Saginaw Steering Gear, Division of General Motors, Saginaw, Mich. It suffices herein merely to point out that each actuator 37 drives a threaded shaft 38 to translate a nut 39 in either direction axially along the shaft when the nut, which is threadedly engaged by the shaft, is held against rotation.

Actuators 37 are mounted in forward cowl portion 21 so that the actuator shafts 38 extend longitudinally through the cascade ring structure 31, each shaft passing between a pair of adjacently disposed cascade channels 36 and thus through one of the cascade channels aforementioned. Each shaft extends to the cascade end ring 34 and is reduced in diameter at its terminal end to provide a journal for engagement with and rotational support by the end ring as indicated at 40, FIGS. 3 and 6.

Aft cowl portion 22 comprises two annular honeycomb panel sections 45 and 46 which are suitably joined together in the annular surface area depicted at 47. It will be understood that sections 45 and 46 have the usual honey comb panel construction which consists of an internal honeycomb core to which facing sheets are bonded as by adhesives or brazing. Sections 45 and 46 are shaped as shown to provide a longitudinal channel or recess 48 therebetween for receiving the cascade ring structure 31 when the forward and aft cowl portions are disposed in abutting engagement as disclosed in FIG. 2, the upstream ends of sections 45 and 46 being angled as depicted at 49 and 50 to form a sealing engagement with ring 27 of the forward cowl portion 21.

The upstream end of aft cowl panel section 45 is recessed as indicated at 51, FIGS. 3 and 7, to receive the actuator nuts 39 which are suitably secured to honeycomb panel sections 45 and 46 as by welding thereto respectively in the regions depicted at 52 and 53. This may also be seen in FIG. 8 wherein a plurality of peripherally spaced cutouts 54 in panel section 45 are provided to respectively seat a plurality of peripherally spaced blocker doors or flaps 55 which are pivotally secured to section 45 as depicted at 56.

As disclosed, each door 55 is in the form of a pan type honeycomb panel section in which one of the facing sheets is pan shaped to receive the honeycomb core with its rim portion being joined to the other facing sheet to thus provide a double skin thickness or flange which extends around the periphery of the door. A pair of hinge brackets 57 is secured to each door and these are disposed at the sides 58 of the door, as best seen in FIG. 6. It will be noted that adjacently disposed doors 55 meet along their side edges 58 when the doors are moved to their deployed blocking positions of FIGS. 3 and 6. Thus when the doors are in their stowed position, as depicted in FIG. 2, the same are disposed entirely at the greater diameter of their hinged upstream portions and gaps develop between their adjacently disposed sides 58. These gaps are filled by the islands 59, FIG. 8, to thus provide a smooth inner flow surface for the aft cowl portion when the doors 55 are nested within the cutouts 54 and disposed between the islands 59 of honeycomb panel section 45 in the stowed position of aft cowl portion 22.

Islands 59, FIG. 8, support U-shaped hinge brackets 60 which may be secured, as by welding to the islands. The legs of the brackets, see also FIG. 6, form the pivot connections 56 with the door hinge brackets 57.

Each door 55 has secured thereto, as by welding a streamlined actuating arm 61 having a socket 62, FIG. 5, for receiving the piston member 63 of a telescoping link generally designated 64, member 63 and arm 61 being pivotally connected as depicted at 65. Link 63 has a head 66 which moves in a cylinder 67 provided in a streamlined housing 68 which is pivotally secured as depicted at 69 to a bifurcated bracket 70, in turn, secured as by welding to strut 16. Alternatively, bracket 69 may be secured to cowl panel 23, or to both the cowl panel 23 and the strut 16.

It will be noted that the strut 16, the telescoping link 64, and the door actuating arm 61 are all disposed within the path of the fan air flow through bypass duct 17. In order to minimize the resultant drag and tendency to produce local separation of the air flow, these members are all streamlined, and link 64 and arm 61 are interfit together, and disposed directly behind strut 16, as best seen in FIGS. 3 to 5.

The downstream end of cylinder 67 of link 64 is suitably threaded to receive a plug 71, FIG. 5, to which the downstream end of a tension coil spring 72 is secured as by welding, the upstream end of spring 72 being similarly secured to piston head 66. With the parts in the position as shown in FIGS. 2, 4 and 5, spring 72 is tensioned and tends to separate telescoping link 64 and the door actuating arm 61, thereby to urge door 55 into its stowed position, as shown in these figures.

In the operation of the reverser as thus far described, the ball screw actuators 37 are operated synchronously to move aft cowl portion 22 and its blocker doors 55 between their stowed and deployed positions, and it will be understood that in view of the nature of this type of drive, the parts will be held in these positions, or in any intermediate moved position, by the drive mechanism itself. It will be understood, moreover, that the screw shafts 38 of the actuators serve as peripherally spaced cantilever beams for the translational support of the aft portion 22 telescopically over the cascades without making sliding contact therewith, the drive nut members 39, as structural parts of the aft cowl portion, serving to provide both this movement and support by reason by reason of their threaded engagement with their respective beam support drive shafts 38.

In the movement of the parts from the stowed position of FIG. 2 to the deployed position of FIG. 3, as the cowl portion translates rearwardly, links 64 and arms 61 for the doors become progressively more and more separated and the tension in their associated coil springs decreases. The doors, however, are held closed in stowed position as long as any tension remains in the springs. When the cascades 33 have become substantially uncovered by downstream movement of the aft cowl portion, the springs 72 will have become untensioned and will occupy the downstream position depicted at 72' in FIG. 3, in which position the convolutions in the springs will be closed to complete a driving connection between their associated links 64 and door arms 61. Thereafter, during the terminal phase of movement of the aft cowl portion 22 into its deployed position, doors 55 are held by their now completed connections 61, 64 to the forward cowl portions 21 and rotated about their pivots 56 on the aft cowl portion 22, this rotation being completed when the doors move to engage the engine wall 14.

It will be apparent that rotational movement of the doors is deferred until the translational movement of the aft cowl portion reaches its terminal phase. In effect, the opening of the cascades and the blocking of the fan air are caused to occur sequentially, and this sequence also obtains on the reverse movement of the parts, the doors being first moved against the increasing tension in springs 72 to stowed position within the door seats 54, before substantial closing of the cascades occurs. This is considered important in relieving the engine of back pressure and other undesired affects.

In the event of structural failure when the parts are in the deployed position of FIGS. 3 and 6, the pressure of the fan air on the doors 55 will retain the same in such position to thus provide a fail-safe operation.

In some conditions of flight and ground roll control it may be desirable to modulate the extent of opening of the cascades and the extent of closing of the blocker doors. To this end, the actuators 37 may be controlled variably to expose a select number of cascades 33 as the aft cowl portion 21 is translated. Likewise, the doors 55 may be positioned selectively to modulate the area of discharge of fan air through the bypass duct 17, this occurring during variably controlled movement of the aft cowl portion during the terminal portion of its translational movement.

Referring now to FIG. 9, there is shown thereon an alternative reverser arrangement in which the fan cowling is split into fixed forward and aft cowl portions 21' and 22'. These cowl portions are separated longitudinally by the cascade ring structure 31' which comprises an upstream end ring 75 secured to sealing ring member 27' of the forward coyl portion 21'. Cascade ring structure 31' also comprises a downstream cascade end ring 76 which is secured to a channel member 34'. Aft cowl portion 22', in this case, is an annular member 77 of any suitable panel type construction which includes channel member 34' as a part thereof.

A translatable sleeve member generally designated 80 is comprised of two concentric panel type sleeve members 81 and 82 which form an annular channel therebetween within which the cascade ring 31' and aft cowl portion 22' are received telescopically as member 80 is translated fore and aft therealong. Sleeve sections 81 and 82 are joined by a plurality of peripherally spaced web members 83 which pass along the cascade channels between adjacently disposed channel members which are of the same construction as channel members 36 of FIG. 7.

Member 80 also comprises an inner arcuately contoured panel type sleeve member 84 which is secured s at 85 to inner sleeve section 82 and is further secured ɔ this section by the box type ring structure designated 6 to which the doors 55' are suitably hinged as depicted t 56'. Doors 55' are contoured to match the contour f sleeve member 84 which has cutouts 54' to receive the oors.

The upstream ends 49' and 50' of sleeve panels 81 and 2 are shaped so as to make sealing engagement with ealing ring 27' when the translatable sleeve section 80 ; moved into its stowed position to thus cover the cascades 33'. This is accomplished by operation of at least ne linear actuator 37' whose actuator shaft 38' is connected, as depicted at 87, to the box ring structure 86 ɔ thus cause translational movement of sleeve 80 as the ctuator shaft 38' is extended in a well known manner.

Actuator 37' is supported in any well-known manner within the forward cowl portion 21' and its actuator shaft 8' extends freely through an opening provided therefor n sealing ring 27'.

Telescoping link 64' and its coacting door arm 61' oth structurally and functionally are generally the same s in the reverser arrangement of FIGS. 1 to 8. In the rrangement of FIG. 9, however, link 64' is secured as depicted at 70' to sealing ring 27'; and a compression ing arrangement is employed, as disclosed in FIG. 10. With reference to FIG. 10, a compression spring 72' is disposed in cylinder 67' of housing 68' between the bottom of the cylinder and the head 66' of piston type link member 63', the cylinder being closed by the threaded plug 71'.

The reverser arrangement of FIG. 9 generally operates n the same manner as the reverser embodiment of FIGS. to 8, except that translational movement of the sleeve ection 80 into deployed position, as shown in FIG. 9, progressively uncovers the cascades 33' which in this ase are fixed both to the forward cowl portion 21' and he aft cowl portion 22', the doors 55' being rotated to heir blocking position in the same manner as in the first lescribed embodiment, except that compression spring '2' exerts a progressively decreasing force thereon tending to yieldably hold the doors in stowed position until he piston head 66' engages the plug 71' to thus initiate otational movement of the doors.

Frm the foregoing it will not be apparent that thrust everser arrangements have been provided which are well dapted to fulfill the aforestated objects of the invention nd that while only two embodiments of the invention ave been described for purposes of illustration, it will e apparent that other forms of the invention are possible.

Having thus described the invention, what is claimed nd desired to be secured by Letters Patent is:

1. A thrust reverser for a fan type jet propulsion engine having an inner wall and a fan concentric therewith and xtending radially beyond said wall, comprising, a cowlng surrounding said fan and spaced from said wall to orm a bypass duct, said cowling being split into forward nd aft butting portions forming inner and outer flow suraces in cruise position, a ring of flow reversing cascades disposed within said aft portion, a plurality of peripherally disposed blocked doors pivoted to said aft portion nd forming part of the inner flow surface thereof in ruise position, actuating means disposed within said owling and controllably interconnecting said forward nd aft cowling portions for translating said aft portion downstream to an extended position for uncovering said ascades, and link means disposed within said bypass duct nd interconnecting said forward cowl portion and said loors for rotating said doors into extended blocking position in said duct during the terminal translational movement of the aft portion to said extended downstream position thereof thereby substantially to open the flow areas hrough the cascades before blocking the flow through aid duct, said actuating means comprising a plurality of actuators mounted on said forward cowl portion and peripherally spaced thereon, said actuators having threaded drive shafts and translatable driving elements mounted translationally thereon and secured to said aft cowl portion, said ring of cascades being secured to said forward cowl portion and having peripherally spaced longitudinal channels for passage of said actuator drive shafts respectively therethrough.

2. A thrust reverser as in claim 1, said ring of cascades having an end ring providing journal support for the terminal end portions of said drive shafts.

3. A thrust reverser as in claim 2, said aft cowl portion having a longitudinally extending annular recess for receiving said ring of cascades therewithin.

4. A thrust reverser as in claim 3, said translatable driving elements being mounted within said annular recess and secured to the opposing wall surfaces thereof.

5. A thrust reverser as in claim 4 wherein said aft cowl portion comprises an assembly of honeycomb panel sections and each of said doors comprises a honeycomb panel section.

6. A thrust reverser for a fan type jet propulsion engine having an inner wall and a fan concentric therewith and extending radially beyond said wall, comprising, a cowling surrounding said fan and spaced from said wall to form a bypass duct, said cowling being split into forward and aft abutting portions forming inner and outer flow surfaces in cruise position, a ring of flow reversing cascades disposed within said aft portion, a plurality of peripherally disposed blocker doors pivoted to said aft portion and forming part of the inner flow surface thereof in cruise position, actuating means disposed within said cowling and controllably interconnecting said forward and aft cowling portions for tranlating said aft portions downstream to an extended position for uncovering said cascades, and link means disposed within said bypass duct and interconnecting said forward cowl portion and said doors for rotating said doors into extended blocking position in said duct during the terminal translational movement of the aft portion to said extended downstream position thereof thereby substantially to open the flow areas through the cascades before blocking the flow through said duct, said link means comprising a yieldable connection for yieldably retaining the doors in said cruise position when said aft cowl portion moves other than during said terminal translational movement thereof.

7. A thrust reverser as in claim 6, each said door having an actuating arm secured thereto and a telescoping link secured to said arm, and said yieldable connection comprising a spring associated with said link to yieldably urge the same to move its associated door into its cruise position.

8. A thrust reverser for a fan jet type propulsion engine having an inner wall and a fan concentric therewith and extending radially beyond said wall, comprising, a cowling surrounding said fan and spaced from said wall to form a bypass duct, said cowling being split and separated into forward and aft cowl portions providing an annular opening therebetween and forming inner and outer flow surfaces in cruise position, a ring of flow reversing cascades disposed within said annular opening and interconnecting said forward and aft cowl portions, a double walled translatable sleeve section mounted for telescoping movement with respect to said aft cowl portion and said ring of cascades and movable into stowed and deployed positions thereof to respectively cover and expose the cascades, said sleeve section providing a portion of said inner and outer flow surfaces when in said stowed position thereof, a plurality of peripherally disposed blocker doors pivoted to said translatable sleeve section and forming part of the inner flow surface thereof, and actuating means disposed within said cowling and controllably interconnecting said forward cowl portion and said translatable sleeve section for translating said sleeve section downstream to said deployed position thereof for uncovering said cascades, and link means disposed within said bypass duct and interconnecting said forward cowl portion and said doors for rotating said doors into extended blocking position in said duct during the terminal translational movement of the sleeve section to said downstream deployed position thereof thereby substantially to open the flow areas through the cascades before blocking the flow through said duct.

References Cited

UNITED STATES PATENTS

| | | | |
|---|---|---|---|
| 3,036,431 | 5/1962 | Vdolek | 60—229 |
| 3,262,270 | 7/1966 | Beavers | 60—22 |
| 3,262,271 | 7/1966 | Beavers | 60—22 |

CARLTON R. CROYLE, Primary Examiner

A. D. HERRMANN, Assistant Examiner

U.S. Cl. X.R.

60—226; 239—265.29, 265.31